United States Patent
O'Leary et al.

(10) Patent No.: US 6,678,344 B2
(45) Date of Patent: Jan. 13, 2004

(54) METHOD AND APPARATUS FOR PRODUCING RADIOISOTOPES

(75) Inventors: Patrick O'Leary, Lynchburg, VA (US); Claude W. Mays, Madison Heights, VA (US)

(73) Assignee: Framatome ANP, Inc., Lynchburg, VA (US)

(*) Notice: Subject to any disclaimer, the term of this patent is extended or adjusted under 35 U.S.C. 154(b) by 31 days.

(21) Appl. No.: 10/077,204

(22) Filed: Feb. 16, 2002

(65) Prior Publication Data

US 2002/0114420 A1 Aug. 22, 2002

Related U.S. Application Data

(60) Provisional application No. 60/270,004, filed on Feb. 20, 2001.

(51) Int. Cl.[7] .............................................. G21G 1/06
(52) U.S. Cl. ..................... 376/170; 376/171; 376/172; 376/174
(58) Field of Search ................................. 376/158, 170, 376/171, 172, 173, 202, 174

(56) References Cited

U.S. PATENT DOCUMENTS

| | | | | | |
|---|---|---|---|---|---|
| 3,940,318 A | * | 2/1976 | Arino et al. | ................... | 205/48 |
| 4,393,510 A | * | 7/1983 | Lang et al. | ................. | 376/172 |
| 4,652,426 A | * | 3/1987 | Boyle et al. | ................. | 376/352 |
| 5,037,607 A | * | 8/1991 | Masumi et al. | ............. | 376/434 |
| 5,171,522 A | * | 12/1992 | Fennern | ...................... | 376/444 |
| 5,299,244 A | * | 3/1994 | Yamauchi et al. | .......... | 376/438 |
| 5,446,773 A | * | 8/1995 | Wakabayashi | .............. | 376/170 |
| 5,499,276 A | * | 3/1996 | Wakabayashi | .............. | 376/170 |

FOREIGN PATENT DOCUMENTS

| | | | | | |
|---|---|---|---|---|---|
| JP | | 06194477 A | * | 7/1994 | ................. 376/409 |
| WO | | WO-97009721 A1 | * | 3/1997 | ................. 376/170 |

OTHER PUBLICATIONS

Nakakayashi et al., "Study of Effective Transmution of Minor Actinides in Heterogeneous Light Water Reactors with Various Neutron Spectra", Oct., 1999, Osaka University, Technology Reports vol. 49, No. 2351, pp. 111–118.*

* cited by examiner

Primary Examiner—Michael J. Carone
Assistant Examiner—Daniel Matz
(74) Attorney, Agent, or Firm—Vytas R. Matas

(57) ABSTRACT

A method and apparatus for optimizing the production of Pu-238 in a nuclear reactor during normal reactor operation is disclosed wherein the production of Pu-238 is confined to one or more selectively replaced fuel cells with target cells located in the inside of the active volume of the reactor core to maximize the neutron flux for target irradiation. The target cells are modified existing nuclear fuel assembly cells having some fuel rods replaced with target rods of Np-237 forming a cluster array and having rings of water filled rods surrounding the target cluster to produce the desired optimal Pu-238 production.

1 Claim, 6 Drawing Sheets

METHOD AND APPARATUS FOR PRODUCING RADIOISOTOPES

This application is a continuation of Patent Application No. 60/270,004 filed Feb. 20, 2001.

BACKGROUND OF THE INVENTION

1. Field of the Invention

The present invention generally relates to the production of commercial and medical radioisotopes and more particularly to a method and apparatus for producing such radioisotopes during normal operation of a commercial nuclear power reactor.

2. Description of the Prior Art

It is generally known that radioisotopes may be produced in a nuclear reactor by using some dedicated target tubes located therein.

By way of example, prior art patents teach various schemes for producing and using the radioisotopes produced in the nuclear reactor.

U.S. Pat. No. 4,393,510 teaches that a nuclear reactor may have flux enhanced Thorium fuel elements blanketed around the active region of a rector core and between the core barrel and the thermal shield to produce radioisotopes such as Uranium 233 (U-233) therein. These fuel elements are disposed within the reactor to be removed and reinserted during refueling or reactor outage. However, there is no teaching of how to use target tubes and encapsulated target material optimally loaded within the reactor to maximize the production of Plutonium 238 (Pu-238) rather than U-233.

U.S. Pat. No. 4,196,047 teaches the use of specimen holders with encapsulated target material for monitoring nuclear reactors. Again, there is no teaching of such target material being optimally loaded in the reactor to maximize Pu-238 production.

U.S. Pat. No. 4,475,948 teaches the use of Lithium Aluminate to produce Tritium by neutron flux in a nuclear reactor but again fails to teach any optimized method for producing Pu-238.

SUMMARY OF THE INVENTION

The present invention is drawn to a method and apparatus for optimizing the production of Pu-238 in a nuclear reactor. To accomplish this end, the production of Pu-238 is confined to replaced target cells located in the inside of the active volume of the reactor core where it can maximize the neutron flux for target irradiation. The invention modifies some existing nuclear fuel assembly by removing some fuel rods and replacing them with target rods and/or water filled rods to produce the desired target cells. The combination of fuel, target and water rods is unique in that selective combinations and locations of these rods within the target cell assembly tailors the neutron energy spectrum for the purpose of optimizing the Pu-238 production while minimizing the production of other, unwanted irradiation by-products.

In view of the foregoing it will be seen that one aspect of the present invention is to provide a method and apparatus for optimized Pu-238 production in a nuclear reactor.

Another aspect is to provide the production of Pu-238 radioisotope during normal reactor operation periods.

Still another aspect is to provide an optimized radioisotope production system of replacement isotope target rods for selective fuel rods.

Still yet another aspect is to provide an optimized radioisotope production system of selectively replaced fuel rods with target rods and water filled rods.

These and other aspects of the present invention will be more fully understood after a perusal of the following description of the preferred embodiment when read in conjunction with the following drawings.

DESCRIPTION OF THE PREFERRED EMBODIMENT

Plutonium 238 (Pu-238) is a radioisotope that is produced today by irradiating Neptunium-Oxide. Pu-238 is different from other commercially produced isotopes. While most commercially produced radioisotopes are generally used to irradiate food and in medical or industrial applications, Pu-238 acts as a high energy heat source upon decay and hence is primarily used as a heat source to power devices such as satellites rather than being used for its radiation qualities.

The present invention details a method and apparatus for optimizing the production of Pu-238 in a nuclear reactor by replacing a select number of centrally located fuel cells with target cell arrays for producing Pu-238.

A Pressurized Water Reactor (PWR) usually has between 121 and 241 fuel cells all horizontally located in the reactor and each being about 14 feet high. Each fuel cell has a series of fuel cells, instrumentation tubes, and guide tubes for movably holding control rods therein to control reactor is output enclosed in a water bath.

Figure 1:
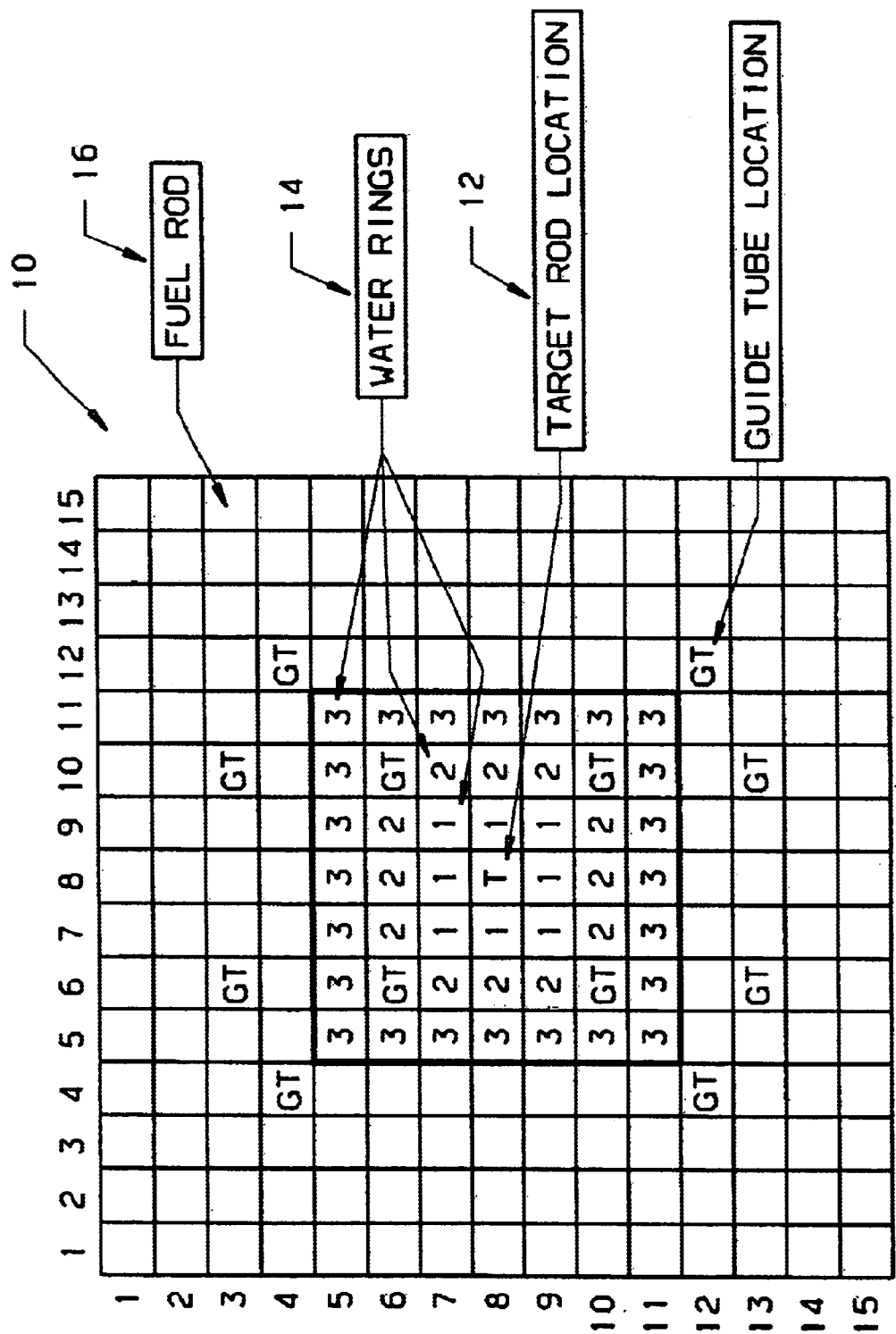
FIG. 1. depicts a schematic of a modified 15×15 fuel rod cell having a centrally located target rod with concentric rings of water filled rods located therearound used to determine the effectiveness of Pu-238 production.

Turning now to FIG. 1, a 15×15 reactor fuel cell array (10) is shown as was configured as a target cell array having a centrally located target tube (12) containing Neptunium-Oxide (Np-237) surrounded by water filled tube locations (14), fuel rod tube locations (16) and guide tube locations G.

Figure 2:
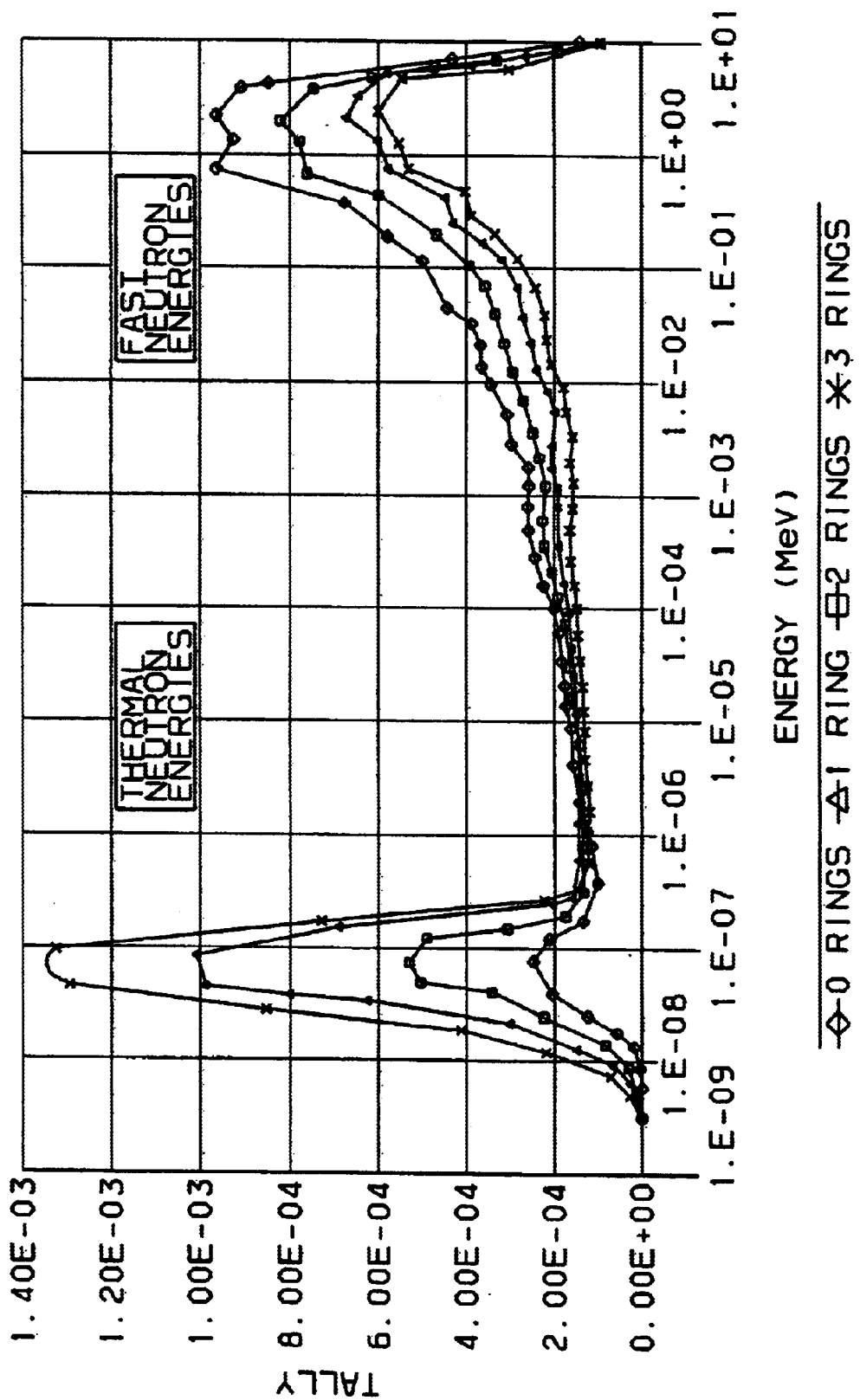
FIG. 2. is a graph of neutron energies for the FIG. 1 schematic.

A set of Monte Carlo (MCNP) nuclear calculations were performed to demonstrate the potential range of neutron energy "tuning" with the use of water rods (14) surrounding a target rod (12) in one fuel cell array contained inside of a commercial nuclear fuel assembly (not shown). For simplicity, a series of 'concentric rings' were modeled around the target rod (12) centrally located inside of one fuel assembly. FIG. 1 depicts the geometric layout of fuel rods, target rod, guide tubes and water rods used in this evaluation. The results of the MCNP calculations are shown in FIG. 2. This plot shows two benefits resulting from the surrounding of the target rod (12) of Np-237 with water rods (14). The first is that the number of thermal neutrons can be increased by a factor of 5 times, when using 0 as opposed to 3 rings of surrounding water rods. This will directly increase the Pu-238 production rate, which is dependent upon the thermal neutron capture reaction in Np-237.

The second benefit comes from the decrease in the fast neutron population by a factor of about 1.6 times, between 0 and 3 rings of surrounding water rods. This reduces an undesirable (n,2n) reaction in the Np-237 target material that produces unwanted Pu-236 which is difficult to separate form the desired product, Pu-238. This demonstrates the benefit of using water rods in a commercial nuclear fuel assembly to tailor the neutron energy spectrum for the purposes of irradiating target rods to produce radioisotopes, in this case Pu-238 from Np-237 thermal neutron absorption.

Based on the above-described calculations a series of different configurations for target rod assemblies (20, 20', 20", 20''') for selective fuel cell replacement are given as examples for optimizing Pu-238 production. They are shown in FIGS. 3–6 and comprise different clusters of target rods (T) surrounded by various numbers of water filled rod cells (shown blank) interspersed among the guide tubes (G) and surrounded by peripherally located fuel rods (F).

Figure 3:
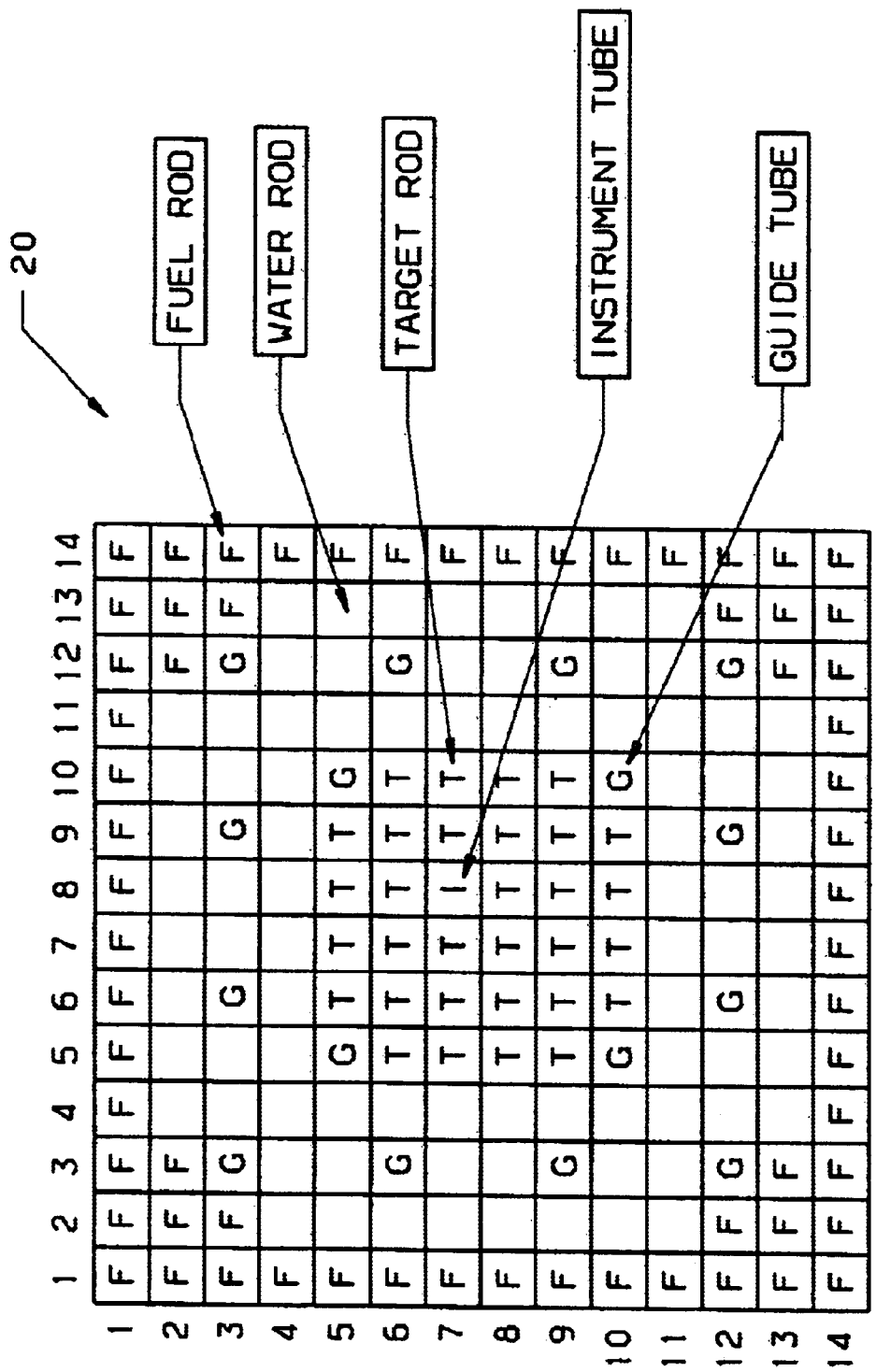
FIG. 3. is a schematic of a 14×14 fuel cell having one type of central target tube configuration surrounded by water filled tubes and fuel rods for optimizing the production of Pu-238 radioisotopes in the target tubes.

The FIG. 3. target rod assembly (20) has a cluster of target rods T centrally located around the central instrumentation tube (I) and the rectangularly located central guide tubes (G). There is at least three rings of water filled tubes around this cluster ending with peripherally located fuel rods (F) as shown.

It will be understood that more than one of the above described target cell assemblies (20) may be used to replace some of the 121–241 fuel cells of the nuclear reactor The same holds for the target cell assemblies (20', 20", 20''').

Figure 4:
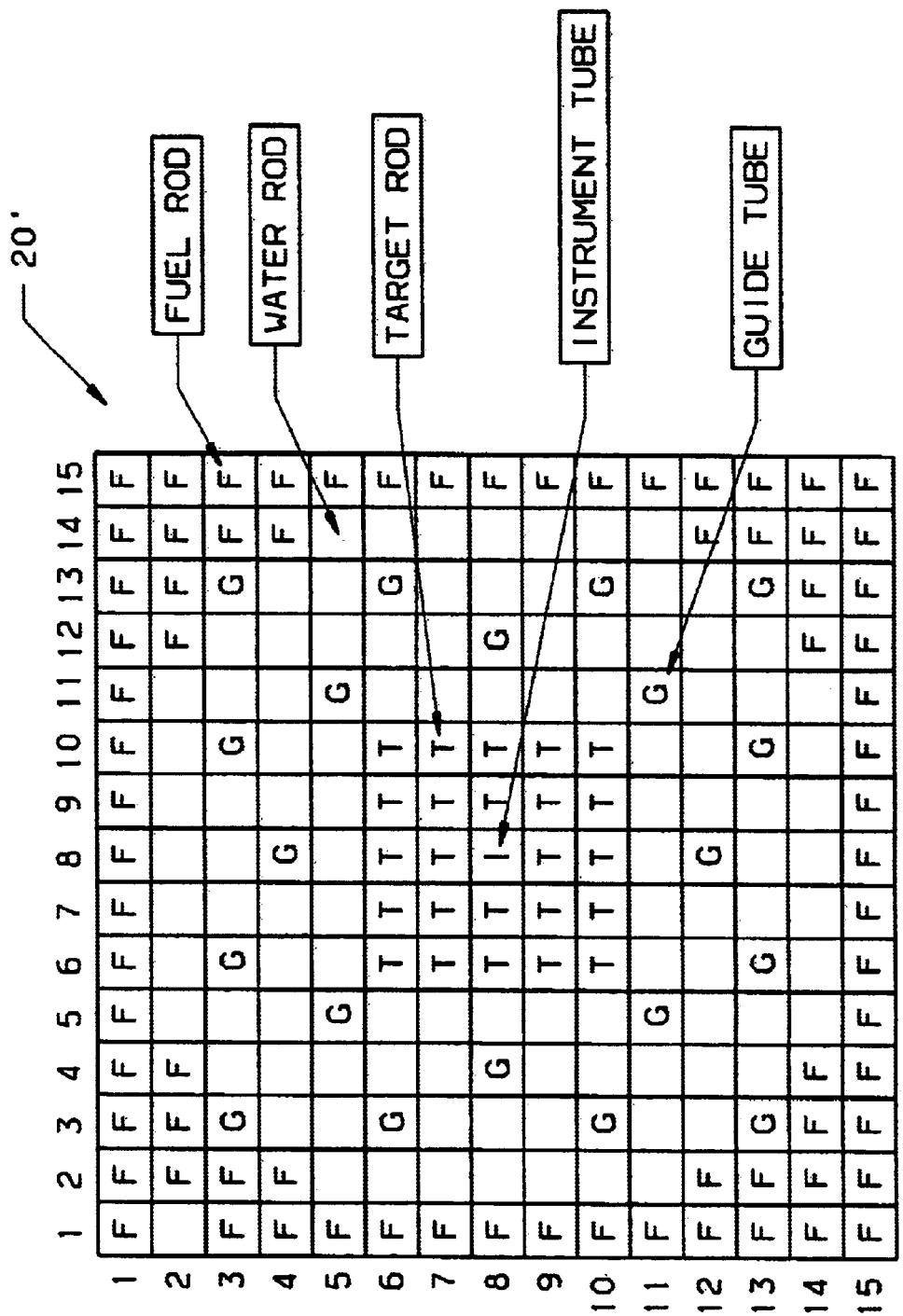
FIG. 4. is a schematic of a 15×15 fuel cell having another target tube configuration surrounded by water filled tubes and fuel rods for optimizing the production of Pu-238 in the target tubes.

FIG. 4. depicts an alternate target cell array (20') having a cluster of target rods T centrally located around the central instrumentation tube (IT) and the rectangularly located central guide tubes (G) in a 15×15 fuel cell array. There is at least three rings of water filled tubes around this cluster ending with peripherally located fuel rods (F) as shown.

Figure 5:
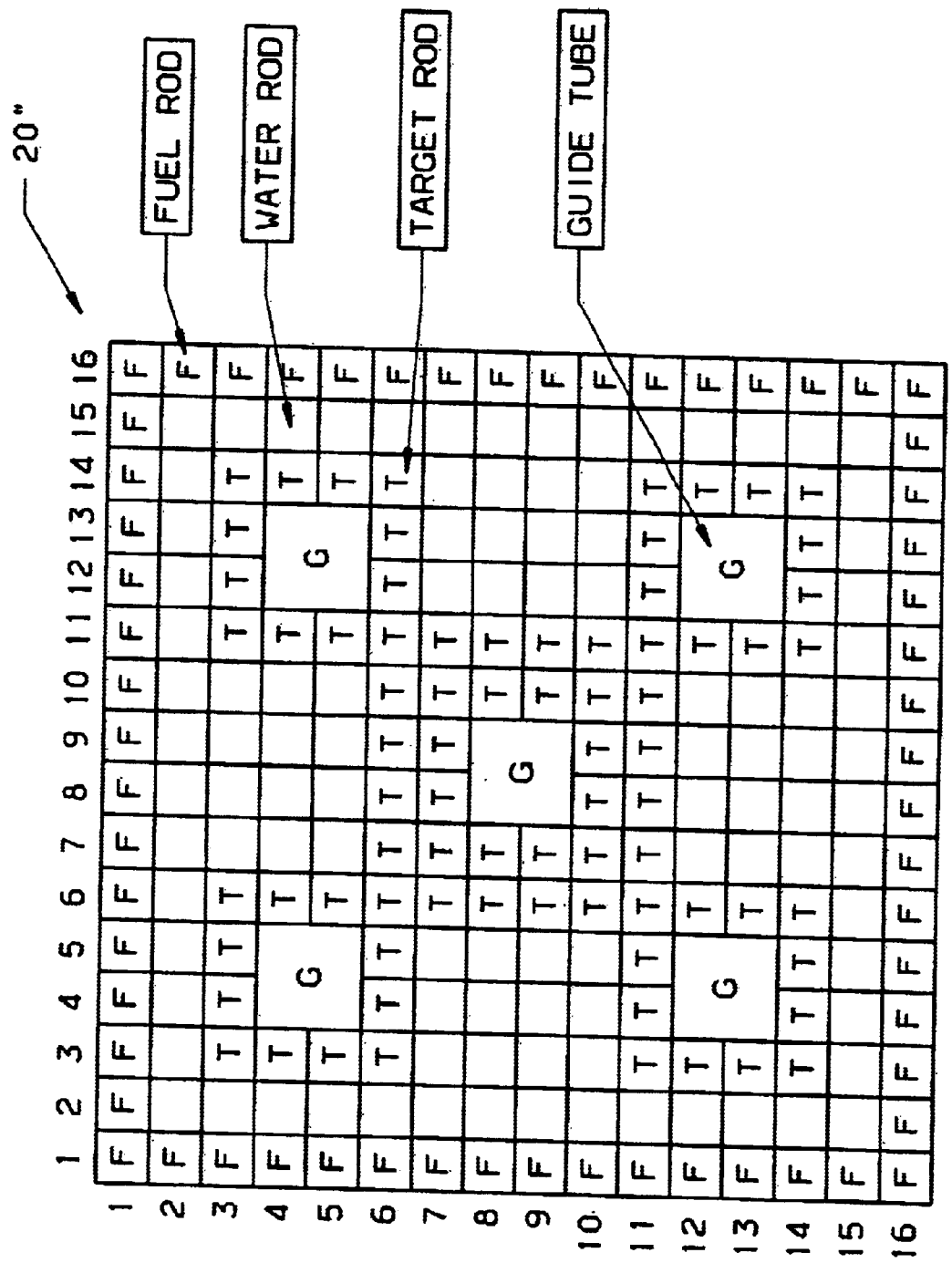
FIG. 5. is a schematic of a 16×16 fuel cell having five target tube configurations oriented around five guide tubes and surrounded by water filled tubes and fuel rods for optimizing the production of Pu-238 in the target tubes.

FIG. 5. depicts an alternate target cell array (20") having a cluster of target rods T located around the five guide tubes (G) in a 16×16 fuel cell array.

Figure 6:
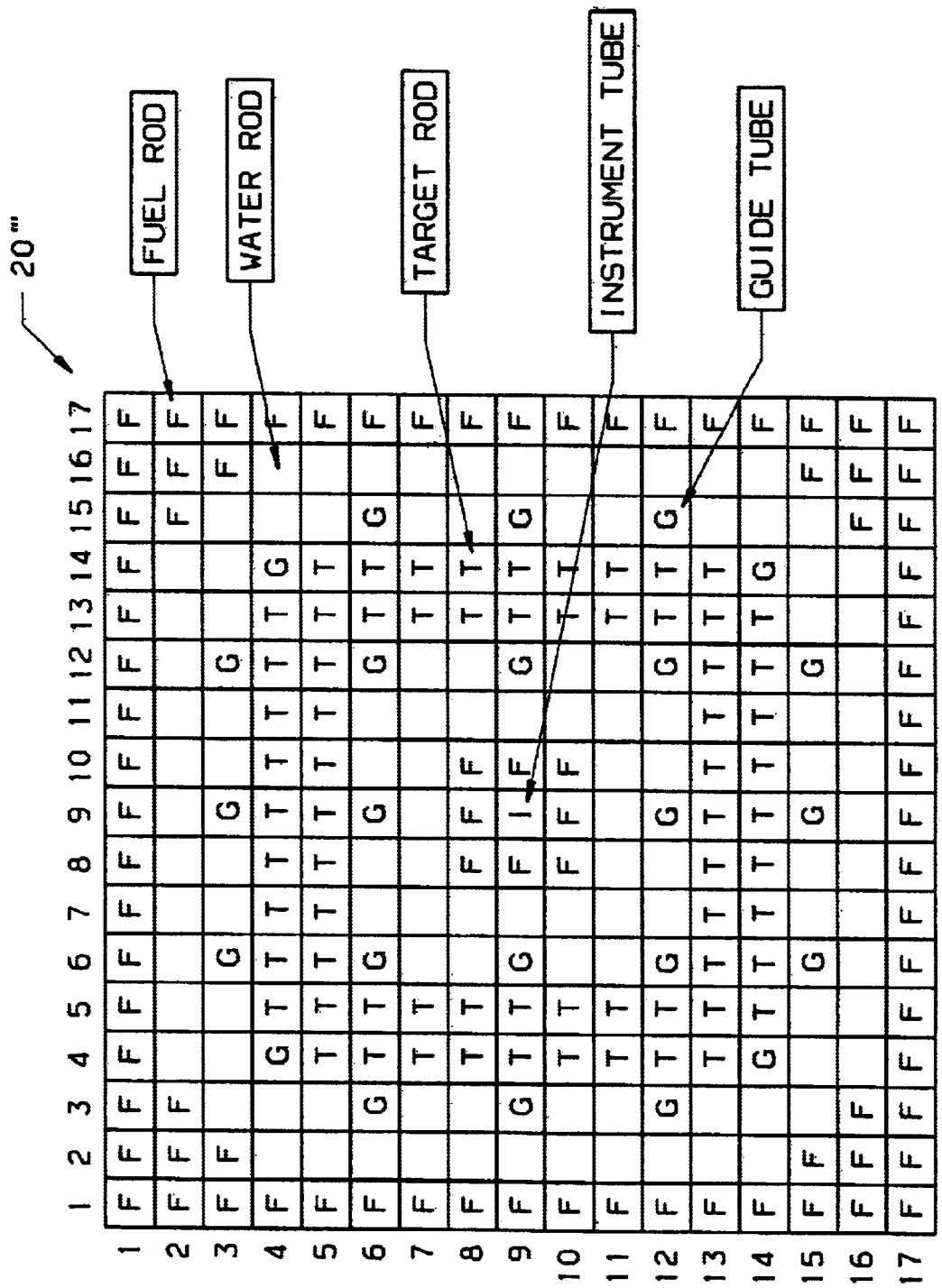
FIG. 6. is a schematic of a 17×17 fuel cell having another target tube configuration surrounded by water filled tubes and fuel rods for optimizing the production of Pu-238 in the target tubes.

FIG. 6. depicts yet another alternate target cell array (20''') comprising a ring of target cells (T) located between a centrally located cluster of fuel rods in addition to an array (20''') of fuel rods located around the periphery. There is generally two water filled tube spacings between the ring of target cells and the fuel rods (F).

It is intended that the above described target cell arrays (20, 20', 20", 20''') be used in commercial nuclear power reactors to provide irradiation services for the purpose of producing radioisotopes such as Pu-238. In general, the central assembly position (or other positions) in a PWR (Pressurized Water Reactor) or BWR (Boiling Water Reactor) are used to load at least one fuel assembly replacement containing "target" material for producing, by way of neutron or gamma ray irradiation, radioisotopes. These target cell assemblies are loaded and off-loaded during normal refuel outages and stored in the spent fuel pool. Another non-irradiated target assembly, previously prepared, is loaded into the core for its irradiation cycle. After the refuel outage ends, the target rods can be removed from the target assembly, packed and shipped off-site for processing. The target assembly can be set up for its next irradiation period and stored until the next refuel outage when it gets loaded back into the core. Similarly, the irradiated target assembly could be off-loaded, have its target cells exchanged with unirradiated target cells, during the same refuel outage and reloaded into the core for its next cycle of irradiation. This method does not preclude other core locations, such as peripheral locations from being used.

As was described, the apparatus is comprised of nuclear fuel rods, control rod guide tubes, water rods and target rods. The arrangement (axially and radially) and numbers of each of these rods can be varied so as to tailor the neutron energy spectrum desired for a particular radioisotope production run. Water rods are used instead of "water holes" to preserve the assembly's thermal-hydraulic performance (i.e.; pressure drop and cross flow mixing). The apparatus could be a re-constituted spent fuel assembly or a specially designed and fabricated assembly cage loaded with the required types and number of fuel, water and target rods. The guide tube positions can not be changed because they must allow for a control rod cluster to be inserted into the assembly. The target rods could be single or multi-piece.

This invention provides additional revenue for commercial nuclear power reactor operators, a new sources of radioisotopes to industry and the US government agencies (i.e.; NASA, Food Irradiators), and provides a new product or engineering service for operators and cell providers.

Certain modifications and additions to this disclose will be obvious to those of ordinary skill in this art area. They have been deleted herein for the sake of conciseness and readability but are intended to fall within the scope of the following claims.

We claim:

1. A method of optimizing the production of Pu-238 in a nuclear reactor having a series of fuel cells comprising the steps of:

providing a target cell array having a central series of target rods filled with Np-237 surrounded by at least three circles of water filled rods for location inside the nuclear reactor with the remaining fuel cells of the reactor surrounding the water filled rods of the target cell array;

replacing a centrally located series of fuel cells of the reactor with the target cell array during the reactor shutdown or refueling cycle to allow the target rods to optimize the production of Pu-238 while minimizing the production of other unwanted irradiation by-products during the normal operation of the reactor; and removing the target cell array during the next reactor shutdown or refueling cycle.

* * * * *